US008965733B2

(12) United States Patent
Liu et al.

(10) Patent No.: US 8,965,733 B2
(45) Date of Patent: Feb. 24, 2015

(54) MACHINE TOOL DATA ACQUISITION DEVICE AND METHOD

(75) Inventors: Shin-Yen Liu, Taiping (TW); Chih-Chiang Kao, Gueishan Township, Taoyuan County (TW); I-Lin Liu, Shenkeng Township, Taipei County (TW); Chun-Tai Yen, Taipei (TW)

(73) Assignee: Institute for Information Industry, Taipei (TW)

( * ) Notice: Subject to any disclaimer, the term of this patent is extended or adjusted under 35 U.S.C. 154(b) by 559 days.

(21) Appl. No.: 12/970,327

(22) Filed: Dec. 16, 2010

(65) Prior Publication Data
US 2012/0136628 A1  May 31, 2012

(30) Foreign Application Priority Data

Nov. 25, 2010  (TW) .............................. 99140709 A

(51) Int. Cl.
*G06F 15/00* (2006.01)
(52) U.S. Cl.
CPC ..................................... *G06F 15/00* (2013.01)
USPC ........................................................ 702/182
(58) Field of Classification Search
USPC ........................................................ 702/182
See application file for complete search history.

(56) References Cited

U.S. PATENT DOCUMENTS

| 5,388,051 | A | * | 2/1995 | Seki et al. ...................... 700/169 |
| 6,167,325 | A | * | 12/2000 | Kamiguchi et al. .......... 700/183 |
| 7,573,900 | B2 | | 8/2009 | Kim et al. |
| 2007/0153802 | A1 | | 7/2007 | Anke et al. |

FOREIGN PATENT DOCUMENTS

| EP | 0 930 744 A1 | 7/1999 |
| TW | 200819993 A | 5/2008 |
| TW | 200834272 A | 8/2008 |

* cited by examiner

*Primary Examiner* — Tung S Lau
(74) *Attorney, Agent, or Firm* — Birch, Stewart, Kolasch & Birch, LLP

(57) ABSTRACT

A machine tool data acquisition device for processing a plurality of far-end acquisition commands transmitted from a plurality of monitoring devices is provided. The far-end acquisition commands are used for requesting a plurality of parameters from a machine tool, and the plurality of parameters constitute a combination of parameters, including: a monitoring device connection module for receiving the plurality of far-end acquisition commands from the plurality of monitoring devices; a command establishing module for establishing a plurality of near-end acquisition commands according to the far-end acquisition commands, wherein there is an sequence among the plurality of near-end acquisition commands, and each near-end acquisition command corresponds to a plurality of parameter acquisition requests used for requesting and acquiring all of the parameters of one combination of parameters; and a machine tool connection module for sequentially transmitting the parameter acquisition requests corresponding to the near-end commands to the machine tool according to the sequence among the near-end acquisition commands, and acquiring the parameters corresponding to the parameter acquisition requests from the machine tool.

5 Claims, 6 Drawing Sheets

MACHINE TOOL DATA ACQUISITION DEVICE AND METHOD

CROSS REFERENCE TO RELATED APPLICATIONS

This Non-provisional application claims priority under 35 U.S.C. §119(a) on Patent Application No(s). 99140709, filed in Taiwan, Republic of China on Nov. 25, 2010, the entire contents of which are hereby incorporated by reference.

BACKGROUND OF THE INVENTION

1. Field of the Invention

The present invention relates to machine tool monitoring techniques, and in particular relates to machine tool data acquisition devices and methods for coordinating monitoring devices and machine tools.

2. Description of the Related Art

FIG. 1A is a diagram showing known machine tool and monitoring devices. The machine tool 110 is coupled to a plurality of monitoring devices 121~123. For monitoring the machine tool 110, each of the monitoring devices 121~123 may transmit far-end parameter acquisition requests to the machine tool 110. FIG. 1B shows a far-end acquisition command transmitted from one monitoring device. In FIG. 1B, the parameter acquisition requests are used to request and acquire a plurality of parameters A, B and C cyclically. The far-end parameter acquisition will sequentially transmit each of the parameter acquisition requests to the machine tool 100 for acquiring a corresponding parameter from the machine tool 110. For example, the corresponding parameter may be the current, the revolution per minute (PRM) or the temperature of the machine tool 110.

However, in the prior art, when the monitoring devices 121~123 transmit the far-end parameter acquisition request to the machine tool 110 at the same time, the order, that the machine tool 100 responds to the parameter acquisition requests transmitted from the monitoring devices 121~123, is unpredictable. Moreover, the machine tool 110 usually responds to one parameter acquisition request at one time, such that a part of the parameter acquisition requests may be accidentally skipped, or the corresponding parameters may not be completely acquired in one periodic cycle. This causes the inability of the monitoring devices 121~123 to acquire all of the parameters from the machine tool 110 smoothly and successfully, which makes the monitoring devices 121~123 prone to making wrong estimations.

Therefore, machine tool users and manufactures need a new way for monitoring of the machine tool to solve the above problems.

BRIEF SUMMARY OF THE INVENTION

A machine tool data acquisition device for processing a plurality of far-end acquisition commands transmitted from a plurality of monitoring devices, wherein the far-end acquisition commands are used for requesting a plurality of parameters from a machine tool, and the plurality of parameters constitute a combination of parameters, comprising: a monitoring device connection module, coupled to the plurality of monitoring devices, for receiving the plurality of far-end acquisition commands from the plurality of monitoring devices; a command establishing module, coupled to the monitoring device connection module, for establishing a plurality of near-end acquisition commands according to the far-end acquisition commands, wherein there is an sequence among the plurality of near-end acquisition commands, and each near-end acquisition command corresponds to a plurality of parameter acquisition requests used for requesting all of the parameters of one combination of parameters; and a machine tool connection module, coupled between the command establishing module and the machine tool, for sequentially transmitting the parameter acquisition requests corresponding to the near-end commands to the machine tool according to the sequence among the near-end acquisition commands, and acquiring the parameters corresponding to the parameter acquisition requests from the machine tool.

A machine tool data acquisition method for processing a plurality of far-end acquisition commands transmitted from a plurality of monitoring devices, wherein the far-end acquisition commands are used for requesting a plurality of parameters from a machine tool, and the plurality of parameters constitute a combination of parameters, comprising the steps of: receiving the plurality of far-end acquisition commands from the plurality of monitoring devices; establishing a plurality of near-end acquisition commands according to the far-end acquisition commands, wherein there is an sequence among the plurality of near-end acquisition commands, and each near-end acquisition command corresponds to a plurality of parameter acquisition requests used for acquiring all of the parameters of one combination of parameters; and sequentially transmitting the parameter acquisition requests corresponding to the near-end commands to the machine tool according to the sequence among the near-end acquisition commands, and acquiring the parameters corresponding to the parameter acquisition requests from the machine tool.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
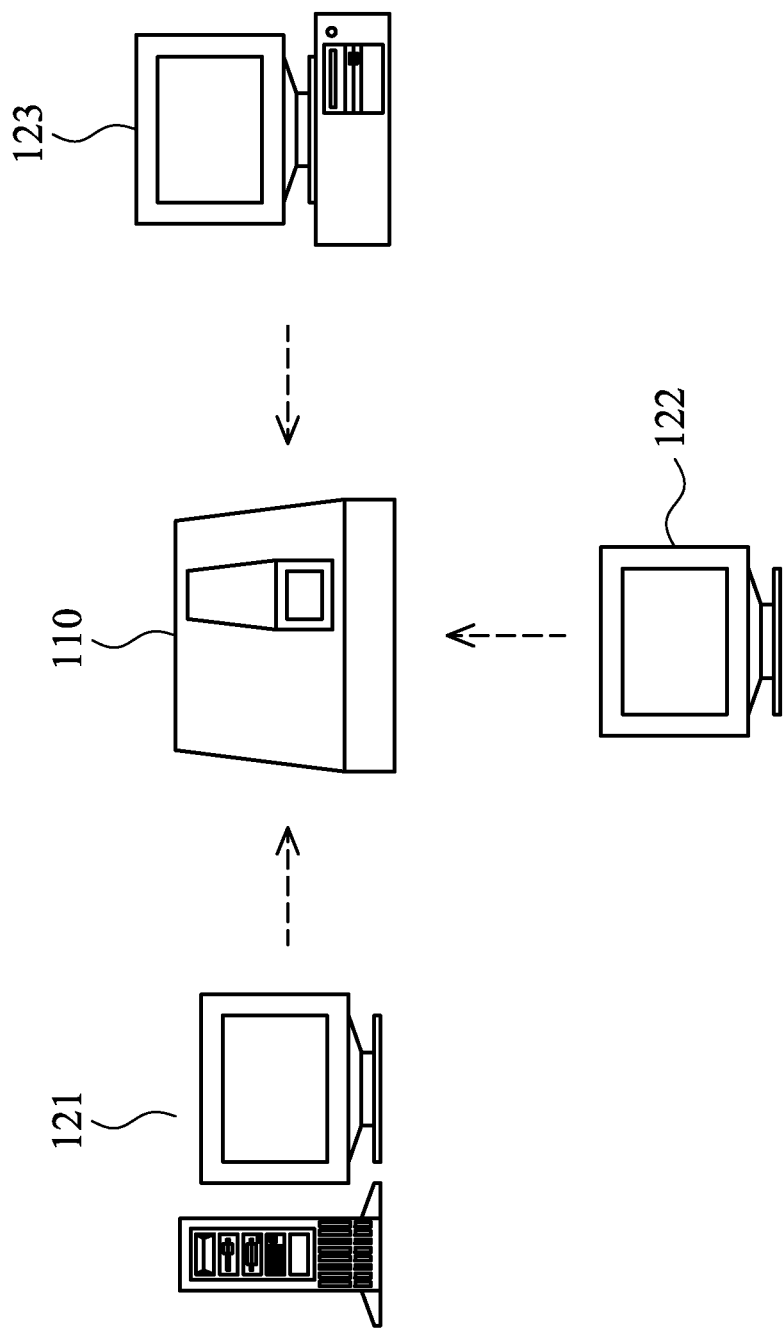
FIG. 1A is a diagram showing known machine tool and monitoring devices.
Figure 1B:
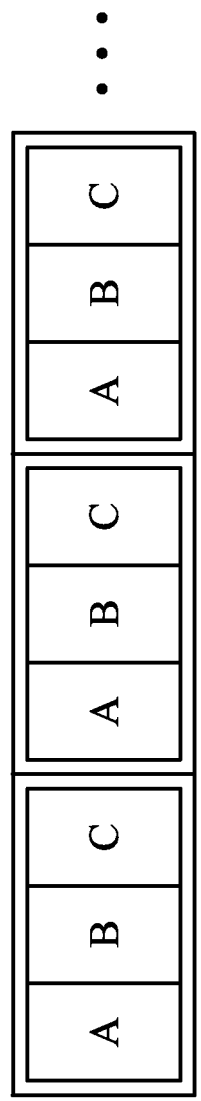
FIG. 1B shows a far-end acquisition command transmitted from one monitoring device.
Figure 2A:
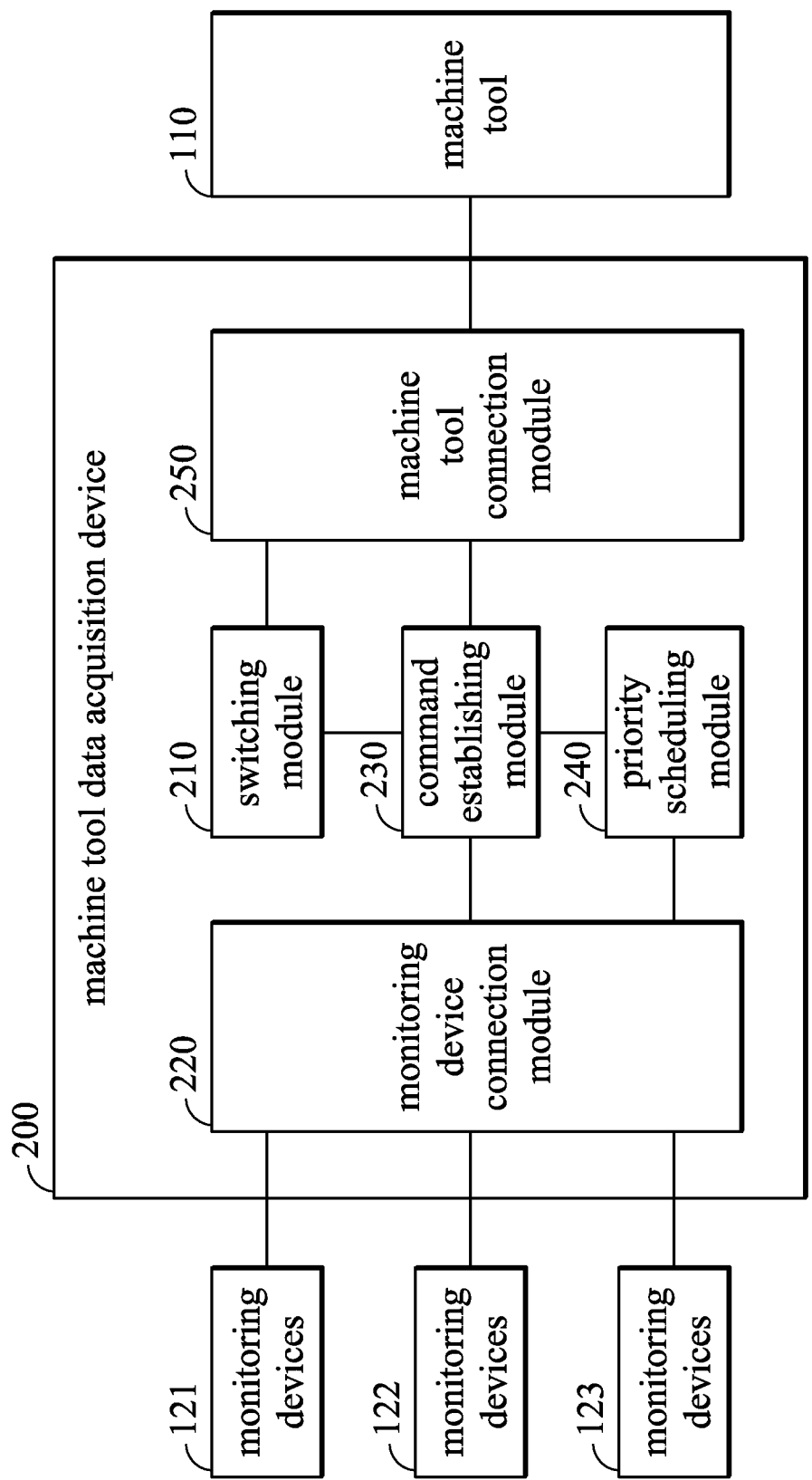
FIG. 2A is a schematic diagram of a machine tool data acquisition device according to an embodiment of the present invention.

FIG. 2A is a schematic diagram of a machine tool data acquisition device according to an embodiment of the present invention. The machine tool data acquisition device 200 of the present invention is used for processing a plurality of far-end acquisition commands transmitted from a plurality of monitoring devices. The far-end acquisition commands are used for requesting and acquiring a plurality of parameters from a machine tool 100, where the plurality of parameters constitutes a combination of parameters. A far-end acquisition command may be used for requesting and acquiring several sequential parameters in one periodic cycle or parameters at the time of the request or acquisition (for example, the parameters are the current, revolution per minute (PRM), or temperature of the machine tool). The machine tool data acquisition device of the present invention may be employed between the machine tool 110 and the monitoring devices 121~123 of related arts to coordinate the data transmission thereof. In the embodiment of FIG. 2A, the machine tool data acquisition device 200 of the present invention is independent from the machine tool 110 and the monitoring devices 121~123 as an independent device (such as a set-top box, a special-purpose machine, an industrial computer or a personal computer), and is connected to the machine tool 100 and the monitoring devices 121~123 through wire or wireless means. In other embodiments, the machine tool data acquisition device 200 of the present invention may be integrated into the machine tool 110 or the monitoring devices 121~123.

The machine tool data acquisition device 200 of the present invention at least comprises a monitoring device connection module 220, a command establishing module 230 and a machine tool connection module 250. In other embodiments, the machine tool data acquisition device 200 further includes a switching module 210 and a priority scheduling module 240. These components of the present invention will be further discussed in the following.

The monitoring device connection module 220 of the present invention is coupled to the monitoring devices 121~123, and used for receiving the plurality of far-end acquisition commands from the plurality of monitoring devices 121~123. Note that each of the monitoring devices 121~123 may transmit the far-end acquisition commands at the same or different time.

Figure 2B:
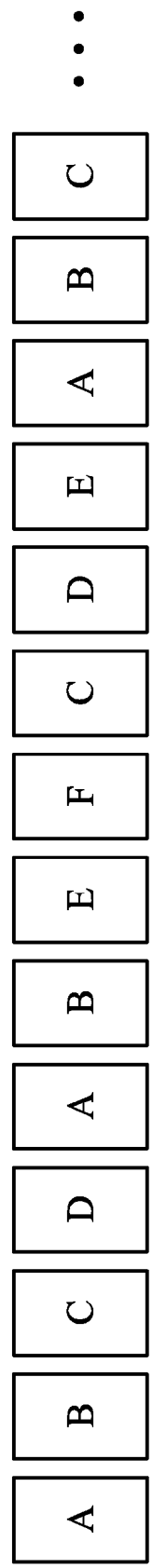
FIG. 2B shows the far-end acquisition commands received from the two monitoring devices.

The far-end acquisition commands are received by the monitoring device connection module 220 of the present invention from various monitoring devices, and may be used to irregularly request and acquire different parameters at different times. FIG. 2B shows the far-end acquisition commands received from the two monitoring devices. In FIG. 2B, the monitoring device 121 transmits a far-end acquisition command which is used to request and acquire the parameters A, B and C (i.e., a combination of parameters) a designated number of times, e.g., N times, while the other monitoring device 122 transmits another far-end acquisition command which is used to request and acquire the parameters D, E and F (i.e., another combination of parameters) another designated number of times, e.g., M times. In the prior art, the parameter acquisition requests received by the machine tool are usually disordered as shown in FIG. 2B. This irregular receiving method may cause the parameter acquisition requests to be accidentally skipped or unable to be received completely in one periodic cycle.

Figure 3:
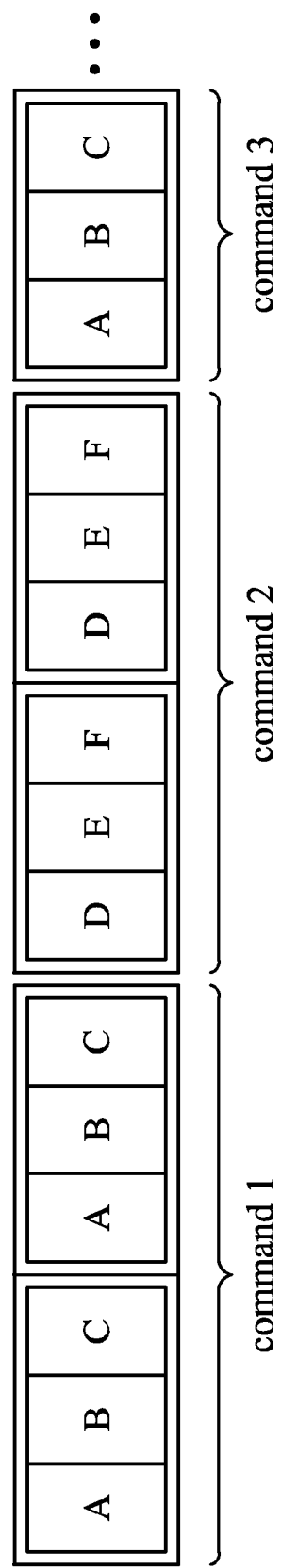
FIG. 3 is a diagram showing the parameter acquisition request transmitted from the machine tool connection module 250 of the present invention.

The command establishing module 230 of the present invention is used to solve this issue. The command establishing module 230 of the present invention is coupled to the monitoring device connection module 220, and used for establishing a plurality of near-end acquisition commands according to the far-end acquisition commands received by the monitoring device connection module 220. Each near-end acquisition command corresponds to a plurality of parameter acquisition requests of all the parameters of one of the combination of parameters. There is an sequence among the near-end acquisition commands, and there are many ways to set the sequence of the near-end acquisition commands. For example, the sequence of the monitoring devices may be set in advance, and the near-end acquisition commands would then be transmitted by following the set sequence of the monitoring devices. Alternatively, the priority of the monitoring devices may be set in advance, and the near-end acquisition commands would then be transmitted by following the set priority of the monitoring devices. In yet another example, the sequence of the near-end acquisition command may be arranged in accordance with the frequency of the far-end acquisition commands. In the embodiment of FIG. 2B, the command establishing module 230 can establish a near-end acquisition command to request and acquire the parameters A, B, and C of the combination of parameters 1 a specific number of times (e.g., twice) according to the far-end acquisition command which is used for requesting and acquiring the combination of parameters 1 (parameters A, B, and C) for N times (in other words, the near-end acquisition command is used to acquire parameters A, B, C, and then A, B, and C, as shown in FIG. 3). Similarly, the command establishing module 230 can also establish another near-end acquisition command to request and acquire the parameters D, E, and F of the combination of parameters 2 a specific number of times (e.g., twice) according to the far-end acquisition command which is used for requesting and acquiring the combination of parameters 2 (parameters D, E, and F) for M times (in other words, another near-end acquisition command is used to acquire parameter D, E, F, and then D, E, and F, as shown in FIG. 3). Note that the command establishing module 230 of the present invention can ensure that the sum of the specific numbers of times, for which all of the near-end acquisition commands have been requested and acquired, will equal to the designated number of times, for which all of the far-end acquisition commands have been requested and acquired. For example, when the far-end acquisition commands request and acquire the parameter A several times (e.g., N times), several near-end acquisition commands established by the command establishing module 230 may respectively request and acquire parameter A number of times (e.g., 2 times at first, then 3 times, and then 2 times . . . ) which is totally summed up as N times. In other words, if a far-end acquisition command used for requesting and acquiring the combination of parameters 1 (parameters A, B and C) N times is received, and the command establishing module 230 establishes a near-end acquisition command for requesting and acquiring parameters A, B and C twice at first, the command establishing module 230 will then establish the other near-end acquisition commands for requesting and acquiring parameters A, B and C for N−2 times.

The machine tool connection module 250 of the present invention is coupled between the command the establishing module 230 and the machine tool 110. After the command establishing module 230 of the present invention establishes the near-end acquisition commands, the machine tool connection module 250 sequentially transmits the parameter acquisition requests corresponding to the near-end commands to the machine tool, and acquires the parameters corresponding to the parameter acquisition requests from the machine tool. The parameters, for example, may be the current, revolution per minute (PRM) or temperature of the machine tool 110.

In other embodiments, the switching module 210 of the present invention is coupled between the command establishing module 230 and the machine tool connection module 250, and used for ensuring that the parameter acquisition requests of one near-end acquisition command are completely transmitted to the machine tool before the transmission of the parameter acquisition requests of a next near-end acquisition command. The technical features of the machine tool connection module 250 and the switching module 210 of the present invention will be further discussed in accordance with FIG. 3A.

In an embodiment, when the machine tool data acquisition device 200 receives a newly added far-end acquisition command, for example, a command for acquiring the parameters A and F of the combination of parameters 3 for P times from a newly added monitoring device, the command establishing module 230 can further establish newly added near-end acquisition commands according to the far-end acquisition commands. The sequence of the near-end acquisition commands may be arranged in accordance with the embodiments previously discussed. In an embodiment, the command establishing module 230 may re-establish a new sequence among the newly added near-end acquisition commands and the unexecuted near-end acquisition commands. Then, the machine tool connection module 250 sequentially transmits the parameter acquisition request corresponding to all of the near-end acquisition commands to the machine tool 100 according to the new sequence, and then acquires the corresponding parameters from the machine tool 100.

FIG. 3 is a diagram showing the parameter acquisition request transmitted from the machine tool connection module 250 of the present invention. The present invention can ensure that the near-end acquisition commands (e.g., for acquiring parameters A, B, C, A, B, and C) from the monitoring device 121 will be completely transmitted to the machine tool 100 before transmitting the next near-end acquisition commands (e.g., for acquiring parameters D, E, F, D, E and F) from another monitoring device 122 to the machine tool 100. Referring to FIG. 2B, originally, the original parameter acquisition requests received by the monitoring device connection module 220 are irregular, but with the present invention, all the parameter acquisition requests will be transmitted to the machine tool completely and correctly no matter how many monitoring devices are present.

In an embodiment, the priority scheduling module 240 of the present invention is coupled between the monitoring device connection module 220 and the command establishing module 230, for arranging near-end acquisition commands to form the sequence based on the priority of the monitoring devices. Specifically, the priority scheduling module 240 may automatically register information of the monitoring devices 121~123 when the monitoring device connection module 220 of the present invention is initially coupled to the monitoring devices 121~123, and the priority of the monitoring devices 121~123 would then be automatically assorted by the priority scheduling module 240 or manually set by users to the monitoring devices 121~123. The command establishing module 230 can establish various near-end acquisition commands and arrange the near-end acquisition commands according to the priority at the same time.

The machine tool data acquisition device 200 of the present invention has been discussed above. In addition to the machine tool data acquisition device 200, the present invention further provides a machine tool data acquisition method. With the same purpose as the machine tool data acquisition device 200, the machine tool data acquisition method is used for processing a plurality of far-end acquisition commands transmitted from a plurality of monitoring devices, wherein the far-end acquisition commands are used for requesting and acquiring a plurality of parameters from a machine tool, where the plurality of parameters constitute a combination of parameters.

Figure 4:
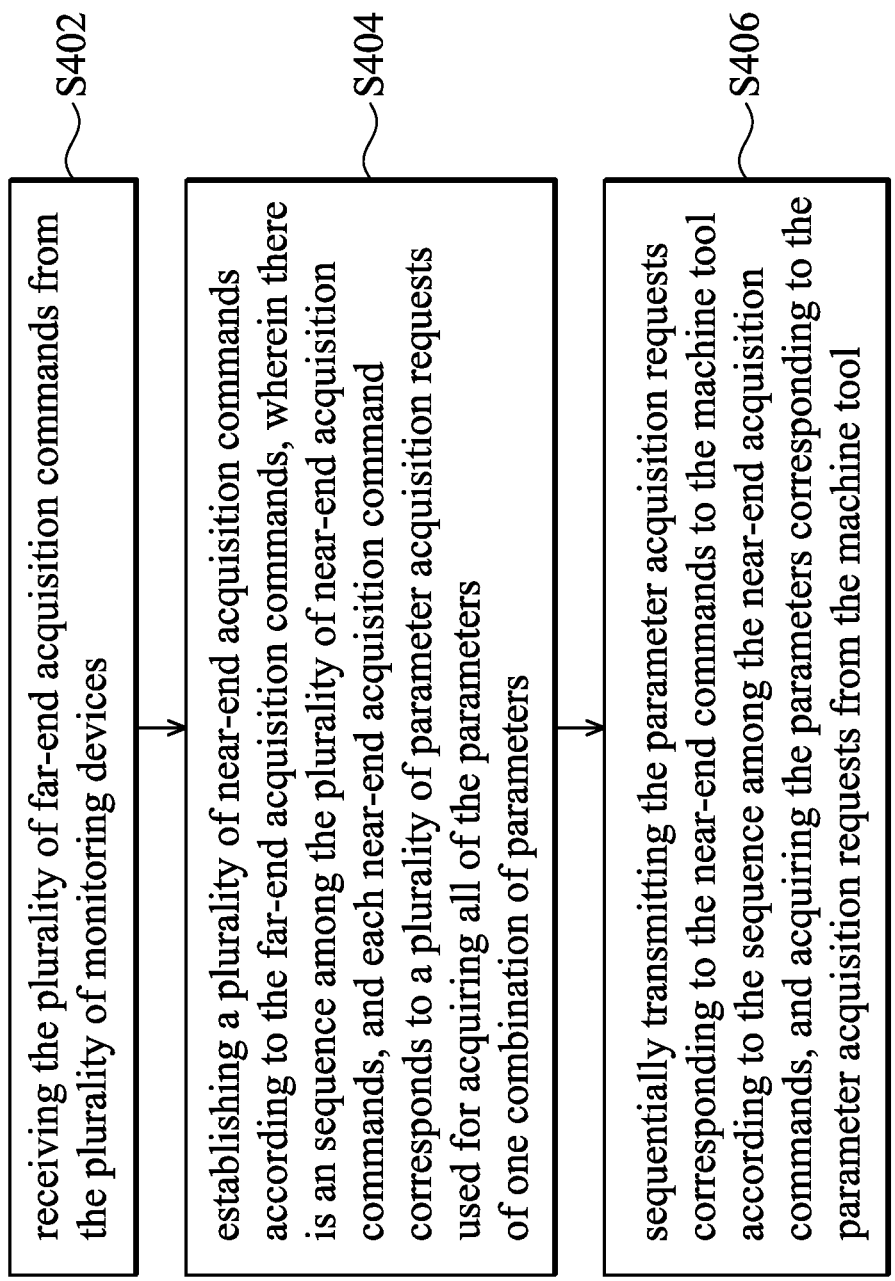
FIG. 4 is a flowchart of the machine tool data acquisition method of the present invention.

FIG. 4 is a flowchart of the machine tool data acquisition method of the present invention. The machine tool data acquisition method of the present invention comprises: in step S402, receiving the plurality of far-end acquisition commands from the plurality of monitoring devices; in step S404, establishing a plurality of near-end acquisition commands according to the far-end acquisition commands, wherein there is an sequence among the plurality of near-end acquisition commands, and each near-end acquisition command corresponds to a plurality of parameter acquisition requests of all the parameters of one combination of parameters; and in step S406, sequentially transmitting the parameter acquisition requests corresponding to the near-end commands to the machine tool according to the sequence among the near-end acquisition commands, and acquiring the parameters corresponding to the parameter acquisition requests from the machine tool.

In an embodiment, the machine tool data acquisition method of the present invention can ensure that the parameter acquisition requests of each near-end acquisition commands are completely transmitted to the machine tool before the transmission of the parameter acquisition requests of a next near-end acquisition command. In a preferred embodiment, the machine tool data acquisition method of the present invention can arrange near-end acquisition commands according to the sequence based on the priority of the monitoring devices.

The machine tool data acquisition method of the present invention can be embodied by using the modules 210~250 of the machine tool data acquisition device 200 previously discussed. Those skilled in the art, interested in the machine tool data acquisition method, may read the embodiments regarding the machine tool data acquisition device 200 of the present invention. Therefore, the embodiments of the machine tool data acquisition method will not be further discussed here.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A machine tool data acquisition device for processing a plurality of first acquisition commands transmitted from a plurality of monitoring devices, wherein the first acquisition commands are used for requesting a plurality of parameters from a machine tool, and the plurality of parameters constitute a combination of parameters, comprising:

a monitoring device connection module, coupled to the plurality of monitoring devices, for receiving the plurality of first acquisition commands from the plurality of monitoring devices;

a command establishing module, coupled to the monitoring device connection module, for establishing a plurality of second acquisition commands according to the first acquisition commands, wherein there is a sequence among the plurality of second acquisition commands, and each second acquisition command corresponds to a plurality of parameter acquisition requests used for requesting all of the parameters of one combination of parameters; and a machine tool connection module, coupled between the command establishing module and the machine tool, for sequentially transmitting the parameter acquisition requests corresponding to the second commands to the machine tool according to the sequence among the second acquisition commands, and acquiring the parameters corresponding to the parameter acquisition requests from the machine tool, wherein the machine tool data acquisition device is coupled between the monitoring devices and the machine tool.

2. The machine tool data acquisition device as claimed in claim 1, further comprising:

a switching module, coupled between the command establishing module and the machine tool connection module, for ensuring that all of the parameter acquisition requests of one second acquisition command are completely transmitted to the machine tool before the transmission of the parameter acquisition requests of a next second acquisition command.

3. The machine tool data acquisition device as claimed in claim 1, wherein each first acquisition command is used to request the plurality of parameters from the machine tool for a designated number of times, each second acquisition command is used to request the plurality of parameters of a combination of parameters for a specific number of times, and the sum of the specific numbers of times that all of the second acquisition commands have made for requesting a specific parameter equals to the designated number of times that all of the first acquisition commands have made requests the specific parameter.

4. The machine tool data acquisition device as claimed in claim 1, further comprising:

a priority scheduling module, coupled between the monitoring device connection module and the command establishing module, for arranging second acquisition commands to form the sequence based on the priority of the monitoring devices.

5. The machine tool data acquisition device as claimed in claim 3, wherein, when the machine tool data acquisition device receives a newly added first acquisition command from a newly added monitoring device, the command establishing module establishes a plurality of newly added second acquisition commands and a new sequence among the unexecuted second acquisition commands and the newly added second acquisition commands according to the newly added first acquisition commands, and the machine tool connection module sequentially transmits the plurality of parameter acquisition requests corresponding to the all of the second acquisition commands to the machine tool according to the new sequence and acquires the parameters corresponding to the parameter acquisition requests from the machine tool.

* * * * *